US008575879B2

(12) United States Patent
Welchko et al.

(10) Patent No.: US 8,575,879 B2
(45) Date of Patent: Nov. 5, 2013

(54) METHODS, SYSTEMS AND APPARATUS FOR CONTROLLING A MULTI-PHASE INVERTER

(75) Inventors: Brian A. Welchko, Torrance, CA (US); Min Dai, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 133 days.

(21) Appl. No.: 13/214,042

(22) Filed: Aug. 19, 2011

(65) Prior Publication Data
US 2013/0043816 A1 Feb. 21, 2013

(51) Int. Cl.
*G05B 9/02* (2006.01)
(52) U.S. Cl.
USPC ...... 318/563; 318/564; 318/400.21; 318/802; 318/807; 318/616; 702/58; 702/59; 702/151; 702/145; 361/23; 361/74; 361/79; 361/84; 324/545; 324/546; 324/765.01
(58) Field of Classification Search
USPC ............ 318/400.21, 490, 812, 767, 727, 377, 318/802, 803, 804, 806, 616, 807, 565, 376, 318/139, 375, 801, 563; 702/58, 59; 361/23, 74, 76, 79, 84; 324/545, 546, 324/765.01
See application file for complete search history.

(56) References Cited

U.S. PATENT DOCUMENTS

| 6,456,946 | B1 * | 9/2002 | O'Gorman | 702/58 |
| 7,064,504 | B2 * | 6/2006 | Imai et al. | 318/400.04 |
| 7,279,862 | B1 * | 10/2007 | Welchko et al. | 318/564 |
| RE42,200 | E | 3/2011 | Welchko et al. | |
| 2003/0046028 | A1 * | 3/2003 | Mir et al. | 702/183 |
| 2008/0185983 | A1 * | 8/2008 | Suzuki | 318/449 |
| 2009/0059446 | A1 * | 3/2009 | Matsui et al. | 361/31 |
| 2009/0099703 | A1 * | 4/2009 | Rehm et al. | 700/293 |
| 2010/0295491 | A1 * | 11/2010 | Schulz et al. | 318/490 |
| 2010/0320953 | A1 * | 12/2010 | Yeh et al. | 318/490 |
| 2011/0040519 | A1 * | 2/2011 | Yeh et al. | 702/145 |

OTHER PUBLICATIONS

Wu Wenjiang et al. "Estimating algorithm of angular velocity on assisted motor" Aug. 16-19, 2009.*

* cited by examiner

*Primary Examiner* — Eduardo Colon Santana
*Assistant Examiner* — Jorge Carrasquillo
(74) *Attorney, Agent, or Firm* — Ingrassia Fisher & Lorenz, P.C.

(57) ABSTRACT

Embodiments of the present invention relate to methods, systems, a machine-readable medium operable in a controller, and apparatus for controlling a multi-phase inverter that drives a multi-phase electric machine. When a sensor fault is detected, a phase current angle is computed based on the feedback stator currents, and used to estimate an angular velocity and an angular position of a rotor of the multi-phase electric machine. When the estimated angular velocity of the multi-phase electric machine is less than a transition angular velocity threshold, an open-circuit response can be applied at the multi-phase inverter by controlling all switches in the multi-phase inverter drive to be open. By contrast, when the estimated angular velocity is greater than the transition angular velocity threshold, a short-circuit response can be applied at the multi-phase inverter by controlling selected switches in the multi-phase inverter drive to connect all phases of the multi-phase inverter to a single bus (e.g., either the plus bus or the minus bus).

20 Claims, 4 Drawing Sheets

METHODS, SYSTEMS AND APPARATUS FOR CONTROLLING A MULTI-PHASE INVERTER

TECHNICAL FIELD

Embodiments of the present invention generally relate to multi-phase systems, and more particularly relates to controlling a multi-phase inverter when a sensor experiences a fault condition.

BACKGROUND OF THE INVENTION

Electric multi-phase machines are utilized in a wide variety of applications. As used herein, the term "multi-phase" refers to three or more phases, and can be used to refer to electric machines that have three or more phases.

For example, many hybrid/electric vehicles (HEVs) include an electric traction drive system that includes a three-phase permanent magnet alternating current (AC) electric machine that is driven by an inverter module. The inverter module is supplied with power from a direct current (DC) power source, such as a storage battery. Windings of the three-phase AC electric machine can be coupled to inverter sub-modules of the inverter module. Each inverter sub-module includes a pair of switches. A pulse width modulation (PWM) module receives voltage command signals and applies PWM waveforms to the voltage command signals to control pulse width modulation of the voltage command signals and generate switching vector signals that are provided to the inverter sub-modules of the inverter module. When the switching vector signals are applied, each pair of switches in each of the inverter sub-module switch in a complementary manner to perform a rapid switching function to convert the DC power to AC power. This AC power drives the AC electric machine, which in turn drives a shaft of HEV's drivetrain.

Many modern AC machine drives use vector control to control the torque applied to the shaft (and thus the angular velocity or "speed") of a rotor of the AC electric machine by controlling the current fed to the AC electric machine. In short, stator phase currents are measured and converted into a corresponding complex space vector that is then transformed to a coordinate system rotating with the rotor of the AC electric machine.

During a fault condition, it is desirable to deviate from normal operation and to apply either an open-circuit fault response or a short-circuit fault response at the inverter module to minimize the electric machine's torque response. Whether an open or short-circuit fault response is applied at the inverter module depends upon the machine's angular velocity (or "speed"). One approach for determining whether an open or short-circuit fault response is to be applied is disclosed in U.S. Pat. No. 7,279,862 B1 and Reissue Pat. RE 42,200, entitled "Fault Handling of Inverter Driven PM Motor Drives" assigned to the assignee of the present invention, their contents being incorporated by reference in their entirety herein.

In most systems, the instantaneous angular velocity of the machine's rotor can be determined based on the output of a position sensor or read directly from a speed sensor. In some situations, however, these sensors may themselves experience a fault, and therefore, the particular instantaneous angular velocity can not be easily determined (i.e., read from a angular velocity sensor or determined from the position sensor). Thus, when the speed/position sensor fails, the angular velocity of the machine is not available, and can not be used to make a decision regarding whether an open-circuit fault response or a short-circuit fault response should be applied at the inverter module to minimize torque response of the machine.

It would be desirable to provide improved methods and apparatus for determining whether an open-circuit fault response or a short-circuit fault response should be applied at an inverter module. It would be desirable if such methods and apparatus can function even when a speed and/or position sensor fails, and angular velocity of the machine is not available for making such determinations. Other desirable features and characteristics of the present invention will become apparent from the subsequent detailed description and the appended claims, taken in conjunction with the accompanying drawings and the foregoing technical field and background.

SUMMARY

Embodiments of the present invention relate to methods, systems, a machine-readable medium operable in a controller, and apparatus for controlling a multi-phase inverter that drives a multi-phase electric machine.

In accordance with some of the disclosed embodiments, a method begins when a sensor fault is detected. The sensor can be a sensor used for sensing rotor position of the multi-phase electric machine and/or rotor angular velocity of the multi-phase electric machine.

In some embodiments, after detecting the sensor fault, a short-circuit response can be applied at the multi-phase inverter by controlling selected switches in the multi-phase inverter drive to connect all phases of the multi-phase inverter to a single bus (e.g., either the plus bus or the minus bus), and controlling all other non-selected switches in the multi-phase inverter drive to be open such that the non-selected switches are not connected to the single bus (e.g., either the plus bus or the minus bus).

When the sensor fault is detected, angular velocity of a rotor of the multi-phase electric machine can be estimated based on feedback stator currents (e.g., stationary reference frame feedback stator currents). For example, in one embodiment a phase current angle is computed based on the feedback stator currents, and based on the computed phase current angle, the angular velocity of the rotor of the multi-phase electric machine and an angular position of the rotor of the multi-phase electric machine can be estimated.

In some embodiments, after estimating the angular velocity and the angular position of the rotor, an optional step can be performed. For example, it can be determined whether or not the estimated angular position of the rotor is sufficiently accurate before proceeding. For instance, in one implementation, a confirmation can be made that the magnitude of an angular difference between the computed phase current angle and the estimated angular position of the rotor is less than an angular threshold before the method proceeds.

It can then be determined whether the estimated angular velocity is greater than a transition angular velocity threshold. In one embodiment, the transition angular velocity threshold is a fixed predetermined angular velocity and is defined based on parameters characteristic of the multi-phase electric machine. In another embodiment, the transition angular velocity threshold is an adjusted predetermined angular velocity and is defined based on parameters characteristic of the multi-phase electric machine adjusted according to at least one of a temperature of the multi-phase electric machine and a voltage of a voltage source.

When the estimated angular velocity of the multi-phase electric machine is less than the transition angular velocity threshold, an open-circuit response can be applied at the multi-phase inverter by controlling all switches in the multi-phase inverter drive to be open.

By contrast, when the estimated angular velocity is greater than the transition angular velocity threshold, a short-circuit response can be applied at the multi-phase inverter by controlling selected switches in the multi-phase inverter drive to connect all phases of the multi-phase inverter to a single bus (e.g., either the plus bus or the minus bus), and controlling all other non-selected switches in the multi-phase inverter drive to be open such that the non-selected switches are not connected to the single bus (e.g., either the plus bus or the minus bus).

In accordance with other embodiments, an apparatus is provided for use with a multi-phase electric machine. The apparatus comprises a multi-phase inverter, a fault detector and a controller. When operating normally, the sensor can be used for sensing at least one of a rotor position and a rotor angular velocity of the multi-phase electric machine, and is designed to provide at least one of an angular velocity signal indicative of the angular velocity of a rotor of the multi-phase electric machine, and an angular position signal indicative of the angular position of the rotor of the multi-phase electric machine. However, when a fault of the sensor is detected, and an indication of the fault is provided to the controller, the controller is operable to estimate angular velocity of the rotor of the multi-phase electric machine based on feedback stator currents, to determine whether the estimated angular velocity is greater than a transition angular velocity threshold, and to apply, depending on the estimated angular velocity, either an open-circuit response or a short-circuit response at the multi-phase inverter.

In accordance with other embodiments, a machine-readable medium is provided that comprises sets of instructions operable in a controller to cause the controller to perform operations comprising: estimating, based on feedback stator currents, angular velocity of a rotor of the multi-phase electric machine; determining whether the estimated angular velocity is greater than a transition angular velocity threshold; and generating control signals to cause either: an open-circuit response to be applied at the multi-phase inverter when the estimated angular velocity of the multi-phase electric machine is less than the transition angular velocity threshold; or a short-circuit response to be applied at the multi-phase inverter when the estimated angular velocity is greater than the transition angular velocity threshold.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Embodiments of the present invention relate to methods, systems and apparatus for controlling a multi-phase machine drive system and can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system.

Before describing in detail embodiments that are in accordance with the present invention, it should be observed that some of the embodiments reside primarily in combinations of method steps and apparatus components related to controlling operation of a multi-phase system. As such, it will be appreciated that embodiments of the invention described herein can be implemented using hardware, software or a combination thereof. In addition, the control circuits described herein may comprise various components, modules, circuits and other logic techniques and methodologies, which can be implemented using a combination of analog and/or digital circuits, discrete or integrated analog or digital electronic circuits or combinations thereof. As used herein the term "module" refers to a device, a circuit, an electrical component, and/or a software based component that executes on a processor to perform a task, which may be defined herein within the context of a method.

Figure 1:
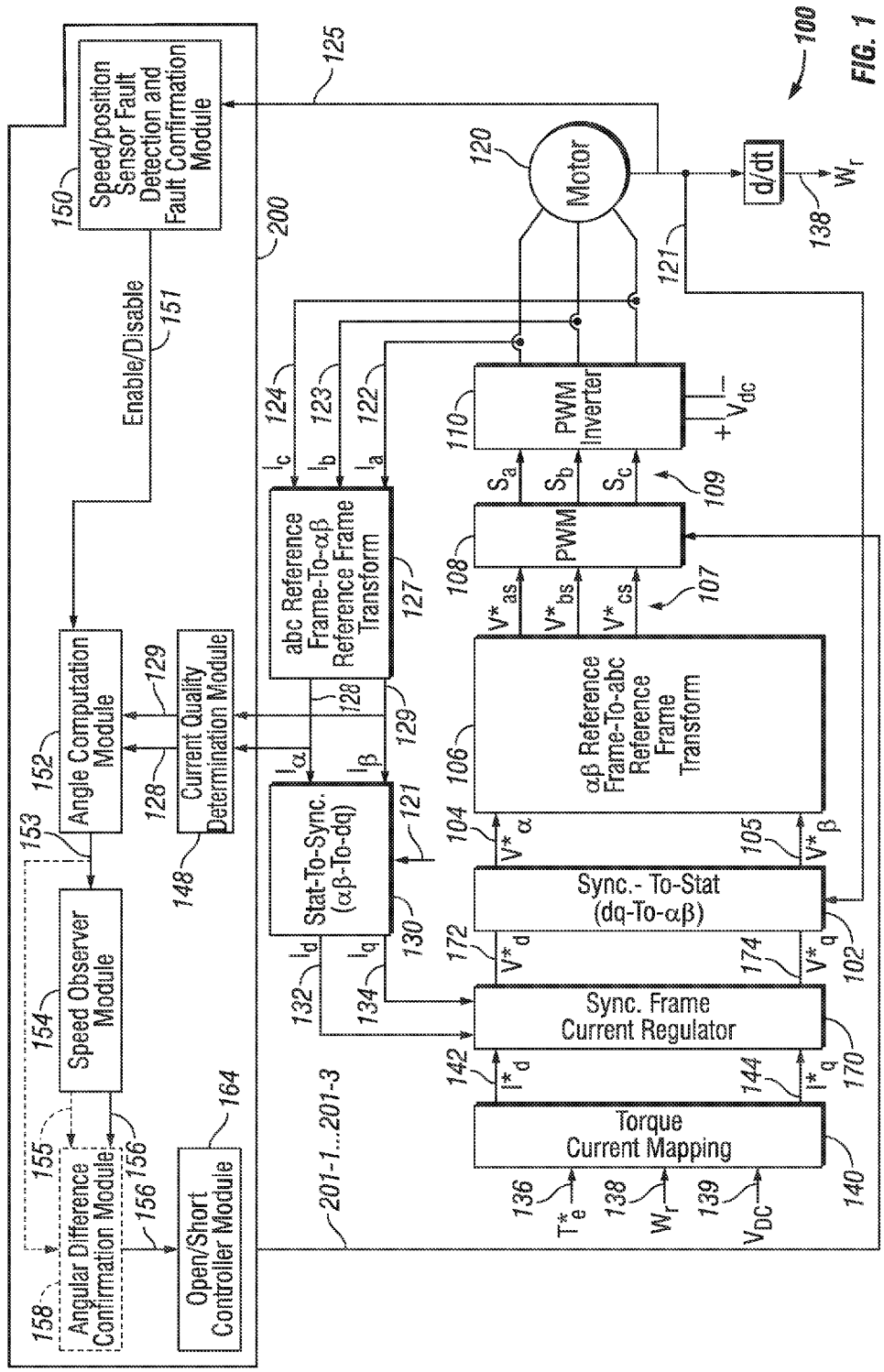
FIG. 1 is a block diagram of one example of a machine drive system in accordance with some of the disclosed embodiments.

FIG. 1 is a block diagram of one example of a vector controlled machine drive system 100 in accordance with the disclosed embodiments. The system 100 controls a three-phase AC machine 120 via a three-phase pulse width modulated (PWM) inverter module 110 coupled to the three-phase AC machine 120 so that the three-phase AC machine 120 can efficiently use a DC input voltage (Vdc) provided to the three-phase PWM inverter module 110 by adjusting current commands that control the three-phase AC machine 120. In one particular implementation, the vector controlled machine drive system 100 can be used to control torque in an HEV.

In the following description of one particular non-limiting implementation, the three-phase AC machine 120 is described as a three-phase, permanent magnet AC machine. However, it should be appreciated that the illustrated embodiment is only one non-limiting example of the types of AC machines that the disclosed embodiments can be applied to. Further, it will also be appreciated that the disclosed embodiments are not limited to a three-phase system, and in other embodiments, the machine 120 can have other numbers of phases, and further that the disclosed embodiments can be applied to any type of multi-phase AC machine that includes fewer or more phases. In one particular implementation, the electric machine 120 comprises a three-phase, permanent-magnet synchronous machine (PMSM) 120.

The three-phase AC machine 120 is coupled to the three-phase inverter module 110 via three inverter poles and generates mechanical power (Torque X Speed) based on three-phase current signals received from the inverter module 110. In some implementations, the angular position of a rotor (θr) 121 or "shaft position" is measured using a position sensor 118 (not illustrated in FIG. 1, but shown in FIG. 2). The derivative of the angular position of a rotor (θr) 121 with respect to time can be used to generate angular velocity (ωr) 138 of the three-phase AC machine 120.

Figure 2:
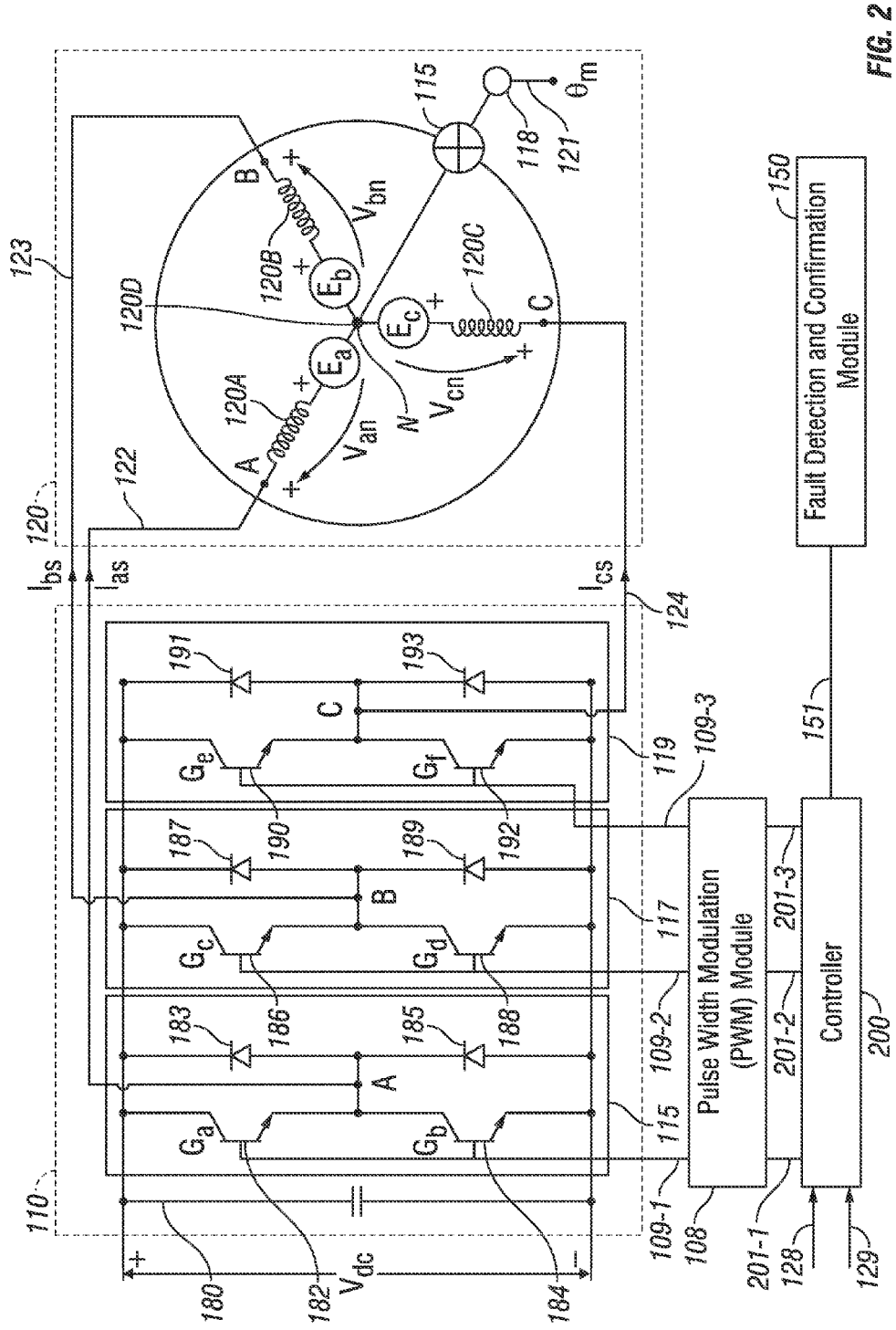
FIG. 2 is a block diagram of a portion of a machine drive system including a three-phase inverter module connected to a three-phase AC machine in accordance with some of the disclosed embodiments.

A more detailed description of one possible implementation of a three-phase voltage source inverter 110 will now be provided including how it is connected to the three phase machine 120 with reference to FIG. 2.

FIG. 2 is a block diagram of a portion of a machine drive system including a three-phase voltage source inverter 110 connected to a three-phase AC machine 120. It should be noted that the three-phase voltage source inverter 110 and the three-phase machine 120 in FIG. 1 are not limited to this implementation; rather, FIG. 2 is merely one example of how the three-phase voltage source inverter 110 and the three-phase machine 120 in FIG. 1 could be implemented in one particular embodiment.

As illustrated in FIG. 2, the three-phase AC machine 120 has three stator or machine windings 120A, 120B, 120C, connected to machine terminals A, B, C, and the three-phase PWM inverter module 110 includes a capacitor 180 and three inverter sub-modules 115, 117, and 119. In this particular embodiment, in phase A the inverter sub-module 115 is coupled to machine winding 120A, in phase B the inverter sub-module 117 is coupled to machine winding 120B, and in phase C the inverter sub-module 119 is coupled to machine winding 120C. The machine windings A, B, C (120A, 120B, 120C) are coupled together at a neutral point (N) 120D. The current into machine winding A 120A flows out machine windings B, C 120B-120C, the current into machine winding B 120B flows out machine windings A and C, 120A, 120C, and the current into machine winding C 120C flows out machine windings A and B, 120A, 120B.

The resultant phase or stator currents (Ia-Ic) 122, 123, 124, flow through respective stator windings 120A-c. The phase to neutral voltages across each of the stator windings 120A-120C are respectively designated as $V_{an}$, $V_{bn}$, $V_{cn}$, with the back electromotive force (EMF) voltages generated in each of the stator windings 120A-120C respectively shown as the voltages $E_a$, $E_b$, $E_c$ each respectively shown connected in series with stator windings 120A-120C. As is well known, these back EMF voltages $E_a$, $E_b$, $E_c$, are the voltages induced in the respective stator windings 120A-120C by the rotation of the permanent magnet rotor. Although not shown, the machine 120 is coupled to a drive shaft.

The inverter 110 includes a capacitor 180, a first inverter sub-module 115 comprising a dual switch 182/183, 184/185, a second inverter sub-module 117 comprising a dual switch 186/187, 188/189, and a third inverter sub-module 119 comprising a dual switch 190/191, 192/193. As such, inverter 110 has six solid state controllable switching devices 182, 184, 186, 188, 190, 192, and six diodes 183, 185, 187, 189, 191, 193, to appropriately switch compound voltage ($V_{DC}$) and provide three-phase energization of the stator windings 120A, 120B, 120C of the three-phase AC machine 120. During normal operating conditions, switching of solid state switching devices 182, 184, 186, 188, 190, 192 within the inverter sub-modules 115, 117, 119 is controlled by providing appropriate control signals to the individual inverter sub-modules 115, 117, 119, thereby controlling the outputs of the inverter sub-modules 115, 117, 119 that are provided to machine windings 120A-120C, respectively. The resultant stator currents (Ia . . . Ic) 122-124 that are generated by the inverter sub-modules 115, 117, 119 of the three-phase inverter module 110 are provided to machine windings 120A, 120B, 120C. The voltages as $V_{an}$, $V_{bn}$, $V_{cn}$, and the voltage at node N fluctuate over time depending on the open/close states of switches 182, 184, 186, 188, 190, 192 in the inverter sub-modules 115, 117, 119 of the inverter module 110. The back electromotive force (EMF) voltages $E_a$, $E_b$, $E_c$ are not influenced by the inverter switching, but only motor speed.

Referring again to FIG. 1, the vector control machine drive system 100 includes a torque-to-current mapping module 140, a synchronous frame current regulator module 170, a synchronous-to-stationary transformation module 102, an αβ reference frame-to-abc reference frame transformation module 106, a Pulse Width Modulation (PWM) module 108, a three-phase PWM inverter 110, an abc reference frame-to-αβ reference frame transformation module 127, a stationary-to-synchronous transformation module 130, and a controller 200 that includes a current quality checking module 148, a fault detection and confirmation module 150, an angle computation module 152, an angular velocity observer module 154, an angular difference confirmation module 158 and an open/short controller module 164.

The torque-to-current mapping module 140 receives a torque command signal (Te*) 136, angular rotation angular velocity (ωr) 138 of the shaft that is generated based on the derivative of the rotor/shaft position output (θr) 121, and the DC input voltage ($V_{DC}$) 139 as inputs, along with possibly a variety of other system parameters depending upon implementation. The torque-to-current mapping module 140 uses these inputs to generate a d-axis current command (Id*) 142 and a q-axis current command (Iq*) 144 that will cause the machine 120 to generate the commanded torque (Te*) at angular velocity (ωr) 138. In particular, the torque-to-current mapping module 140 uses the inputs to map the torque command signal (Te*) 136 to a d-axis current command signal (Id*) 142 and a q-axis current command signal (Iq*) 144. The synchronous reference frame d-axis and q-axis current command signals (Id*, Iq*) 142, 144 are DC commands that have a constant value as a function of time.

The abc-to-αβ transformation module 127 receives the measured three-phase stationary reference frame feedback stator currents (Ia . . . Ic) 122-124 that are fedback from machine 120. The abc-to-αβ transformation module 127 uses these three-phase stationary reference frame feedback stator currents 122-124 to perform an abc reference frame-to-αβ reference frame transformation to transform the three-phase stationary reference frame feedback stator currents 122-124 into stationary reference frame feedback stator currents (Iα, Iβ) 128, 129. The abc-to-αβ transformation can be performed using any known transformation technique including using the matrices defined in equation (1) below.

$$\begin{bmatrix} i_\alpha \\ i_\beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_a \\ i_b \\ i_c \end{bmatrix} \quad (1)$$

In equation (1) the column vector that represents the three-phase stationary reference frame feedback stator currents 122-124 is multiplied by a transformation matrix and scaling factor to generate a column vector that represents the stationary reference frame feedback stator currents (Iα, Iβ) 128, 129.

The stationary-to-synchronous transformation module 130 receives the stationary reference frame feedback stator currents (Iα, Iβ) 128, 129 and the rotor angular position (θr) 121 and generates (e.g., processes or converts) these stationary reference frame feedback stator currents (Iα, Iβ) 128, 129 to generate a synchronous reference frame d-axis current signal (Id) 132 and a synchronous reference frame q-axis current signal (Iq) 134. The process of stationary-to-synchronous conversion is well-known in the art and for sake of brevity will not be described in detail.

The synchronous frame current regulator module 170 receives the synchronous reference frame d-axis current signal (Id) 132, the synchronous reference frame q-axis current signal (Iq) 134, the d-axis current command (Id*) 142 and the q-axis current command (Iq*) 144, and uses these signals to generate a synchronous reference frame d-axis voltage command signal (Vd*) 172 and a synchronous reference frame q-axis voltage command signal (Vq*) 174. The synchronous reference frame voltage command signals (Vd*, Vq*) 172, 174 are DC commands that have a constant value as a function of time for steady state operation. Because the current commands are DC signals in the synchronous reference frame they are easier to regulate in comparison to AC stationary reference frame current commands. The process of current to voltage conversion can be implemented as a Proportional-Integral (PI) controller, which is known in the art and for sake of brevity will not be described in detail.

The synchronous-to-stationary transformation module 102 receives the synchronous reference frame d-axis voltage command signal (Vd*) 172 and the synchronous reference frame q-axis voltage command signal (Vq*) 174 along with the rotor position output (θr) 121. In response to these inputs, the synchronous-to-stationary transformation module 102 performs a dq-to-αβ transformation to generate an α-axis stationary reference frame voltage command signal (Vα*) 104 and a β-axis stationary reference frame voltage command signal (Vβ*) 105. The stationary reference frame α-axis and β-axis voltage command signals (Vα*, Vβ*) 104, 105 are in the stationary reference frame and therefore have values that vary as a sine wave (that are spaced 90 degrees apart) as a function of time. The process of synchronous-to-stationary conversion is well-known in the art and for sake of brevity will not be described in detail.

The αβ-to-abc transformation module 106 receives the stationary reference frame voltage command signals (Vα*, Vβ*) 104, 105, and based on these signals, generates stationary reference frame voltage command signals (Vas* ... Vcs*) 107 (also referred to as "phase voltage signals" or "phase voltage command signals") that are sent to the PWM module 108. The αβ-to-abc transformation can be performed using any known transformation technique including using the matrices defined in equation (2) below.

$$\begin{bmatrix} v_a \\ v_b \\ b_c \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} v_\alpha \\ v_\beta \end{bmatrix} \quad (2)$$

In equation (2) the column vector that represents the stationary reference frame voltage command signals (Vα*, Vβ*) 104, 105 is multiplied by a transformation matrix and scaling factor to generate a column vector that represents the stationary reference frame voltage command signals (Vas* ... Vcs*) 107 (or "phase voltage command signals").

The three-phase PWM inverter module 110 is coupled to the PWM module 108. The PWM module 108 is used for the control of pulse width modulation (PWM) of the phase voltage command signals (Vas* ... Vcs*) 107. The switching vector signals (Sa ... Sc) 109 are generated based on duty cycle waveforms that are not illustrated in FIG. 1, but are instead internally generated at the PWM module 108 to have a particular duty cycle during each PWM period. The PWM module 108 modifies the phase voltage command signals (Vas* ... Vcs*) 107 based on the duty cycle waveforms (not illustrated in FIG. 1) to generate switching vector signals (Sa ... Sc) 109, which it provides to the three-phase PWM inverter module 110. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the three-phase AC powered machine 120 at varying angular velocities based on the DC input 139.

The switching vector signals (Sa ... Sc) 109 control the switching states of switches in PWM inverter 110 to generate three-phase voltage commands at each phase A, B, C. The switching vector signals (Sa ... Sc) 109 are PWM waveforms that have a particular duty cycle during each PWM period that is determined by the duty cycle waveforms that are internally generated at the PWM module 108.

As described above, the switching states of switches in inverter module 110 are controlled using switching vector signals (Sa ... Sc) 109 to generate three-phase stationary reference frame feedback stator currents 122-124. During normal operation, the three-phase inverter module 110 is controlled so that at no time are both switches in the same inverter sub-module 115-117 or "leg" are turned on to prevent the DC supply from being shorted. As such, the switches in the same inverter sub-module 115-117 are operated in a complementary manner (during normal operation) such that when one is off the other is on and vice versa. To explain further, in a given phase (A ... C) at any particular time, one of the switches is off and the other one of the switches is on (i.e., the two switches in a particular inverter sub-module must have opposite on/off states). As such, for a particular inverter sub-module, the on/off status of the two switches in that inverter sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0).

The three-phase PWM inverter module 110 receives the DC input voltage (Vdc) and switching vector signals (Sa ... Sc) 109, and uses them to generate three-phase alternating current (AC) voltage signal waveforms at inverter poles that drive the three-phase AC machine 120 at varying angular velocities (ω$_r$).

The three-phase machine 120 receives the three-phase voltage signals generated by the PWM inverter 110 and generates a machine output at the commanded torque Te* 136.

Although not illustrated in FIG. 1, the system 100 may also include a gear coupled to and driven by a shaft of the three-phase AC machine 120. The measured feedback stator currents (Ia-Ic) 122-124 are sensed, sampled and provided to the abc-to-αβ transformation module 127 as described above.

Three-Phase Open and Short States

When a sensor fault occurs, the AC electric machine 120 should be shut down in a controlled manner. To do so, one of two fault responses can be applied: an open-circuit fault response or a short-circuit fault response. Which response should be applied depends on the angular velocity of the AC electric machine 120 and whether it exceeds a transition angular velocity (e.g., about 7,000 rpm).

When the AC electric machine 120 rotates at angular velocities below the transition angular velocity, the controller should apply an open-circuit fault response to force all switches of the inverter module to be off (i.e., open circuit). This causes the AC electric machine 120 to be put into an uncontrolled generator mode (UCG mode) so that the AC electric machine 120 generates no current and produces no breaking torque.

On the other hand, if the AC electric machine 120 is rotating at angular velocities above the transition angular velocity, the UCG mode generates increasingly more current with increasing angular velocity, which produces increasingly more breaking torque. Therefore, the controller seeks to avoid switching to the open-circuit fault response when the AC electric machine 120 rotates at angular velocities above the transition angular velocity.

At angular velocities below the transition angular velocity, the short-circuit response generates increasingly more current from the AC electric machine 120 (as angular velocity is increased from zero rpm) and initially produces increasingly more breaking torque at low rpm, but diminishing torque as the rpm approaches the transition angular velocity In accordance with the disclosed embodiments, when an angular position sensor and/or angular velocity sensor (or "speed sensor") experiences a fault, the fault is detected and an indication of the fault is provided to the controller 200. The controller 200 can receive the stationary reference frame feedback stator currents (Iα, Iβ) 128, 129. Based on these stationary reference frame feedback stator currents (Iα, Iβ) 128, 129, the controller 200 can estimate angular velocity of the rotor, and then generate control signals 202-1 . . . 201-3 that are provided to the PWM module 108 to cause either an open-circuit fault response or short-circuit fault response to be applied at the inverter module 110. The control signals 201 will either (1) cause all switches within the inverter module 110 to open, or (2) cause selected ones of the switches (e.g., 182, 186, 190, or 184, 188, 192) within the inverter module 110 to close so that all phases of the inverter module 110 are connected to a single bus (e.g., either the plus bus or the minus bus), while all other non-selected switches (184, 188, 192, or 182, 186, 190) in the inverter module 110 are left open such that the non-selected switches are not connected to the single bus (e.g., either the plus bus or the minus bus).

To explain further, when an open-circuit fault response is applied at the inverter module 110, the open-circuit fault response control signals 201 are designed to cause the output signals 109 from PWM module 108 to open all switches 182, 184, 186, 188, 190, 192 within the inverter module 110, and thus effectively place the switches 182, 184, 186, 188, 190, 192 in the inverter module 110 in an open state (also known as a three-phase open-circuit fault response). By opening all of the switches 182, 184, 186, 188, 190, 192 in the inverter module 110, this forces all switches of the inverter module to be off (i.e., open circuit), which causes the AC electric machine 120 to be put into an uncontrolled generator mode (UCG mode) so that the AC electric machine 120 generates no current.

By contrast, when short-circuit fault response is applied at the inverter module 110, the close response control signals 201 are designed to cause the output signals 109 from PWM module 108 to close selected ones of the switches (e.g., 182, 186, 190, or 184, 188, 192) within the inverter module 110 to connect all phases of the inverter module 110 to a single bus (e.g., either the plus bus or the minus bus), and to cause all other non-selected switches (184, 188, 192, or 182, 186, 190) in the inverter module 110 to be open such that the non-selected switches are not connected to the single bus (e.g., either the plus bus or the minus bus). Collectively, this is known as a short-circuit fault response, where half of the switches of the inverter module 110 are in a shorted state. When the selected ones of the switches (e.g., 182, 186, 190, or 184, 188, 192) within the inverter module 110 connect all phases of the inverter module 110 to a single bus (e.g., either the plus bus or the minus bus), and the non-selected switches (184, 188, 192, or 182, 186, 190) are open (and not connected to the single bus). Applying this short-circuit fault response generates increasingly more current from the AC electric machine 120 (as angular velocity is increased from zero rpm) and initially produces increasingly more breaking torque at low rpm, but diminishing torque as the rpm approaches the transition angular velocity.

As illustrated in FIG. 1, the controller 200 includes a current quality checking module 148, a fault detection and confirmation module 150, an angle computation module 152, an angular velocity observer module 154, an angular difference confirmation module 158 and an open/short controller module 164.

The fault detection and confirmation module 150 receives the angular velocity/position output signal 125 from the angular velocity/position sensor 121 is output by motor 120. Based on the angular velocity/position output signal 125 from the angular velocity/position sensor 121, the fault detection and confirmation module 150 generates an enable/disable signal 151 that provides to the controller 200. The controller 200 is controlled by an enable/disable signal 151 from the fault detection and confirmation module 150 such that enable/disable signal 151 is used to either enable or disable the controller 200. The controller 200 is enabled only when it receives an enable signal 151 from the fault detection and confirmation module 150. Otherwise, the controller 200 receives a disable signal 151 and is not operational. In other words, the controller 200 is only enabled are activated when fault detection and confirmation module 150 is determined that a sensor fault has been detected and confirmed. Numerous different implementations of the fault detection and confirmation module 150 are known in the art, and any known fault detection and confirmation module 150 can be used depending on the implementation. In alternative embodiments, the speed observer module is run on a continuous basis so that an appropriate alternative speed estimate always exists and is immediately ready to be used upon the detection of a fault by module 150.

In addition, the current quality checking module 148 also controls whether or not any input signals (i.e., the stationary reference frame feedback stator currents (Iα, Iβ) 128, 129) are provided to the controller 200 and therefore also effectively controls whether or not the controller 200 will be operational. The current quality checking module 148 monitors the stationary reference frame feedback stator currents (Iα, Iβ) 128, 129, and computes a magnitude ($I_s$) of the stationary reference frame feedback stator currents per equation (2) below, which it compares to a high current threshold ($I_{sthhigh}$) and a low current threshold ($I_{sthlow}$) to determine whether the stationary reference frame feedback stator currents (Iα, Iβ) 128, 129 are adequate or qualified to be provided to and thus enable the controller 200. In particular, the current quality checking module 148 computes the magnitude ($I_s$) of the stationary reference frame feedback stator currents per equation (2) as follows:

$$I_s = \sqrt{I_\alpha^2 + I_\beta^2} \qquad (2)$$

The low current threshold ($I_{sthlow}$) and the high current threshold ($I_{sthhigh}$) are the lower and upper boundaries of a hysteresis band for noise debouncing. When the magnitude ($I_s$) of the stationary reference frame feedback stator currents is less than the low current threshold ($I_{sthlow}$), the stationary reference frame feedback stator currents (Iα, Iβ) 128, 129 are inadequate and disqualified to be provided to the controller 200, and the controller 200 is disabled since the stationary reference frame feedback stator currents (Iα, Iβ) 128, 129 are not provided to the controller 200 and the controller 200 therefore receives no stationary reference frame feedback stator currents (Iα, Iβ) 128, 129.

When the magnitude ($I_s$) of the stationary reference frame feedback stator currents is greater than the low current threshold ($I_{sthlow}$) and less than the high current threshold ($I_{sthhigh}$), the qualification status of $I_s$ does not change and the current quality checking module 148 continues to monitor the magnitude ($I_s$) of the stationary reference frame feedback stator currents until one of the conditions above occurs and the stationary reference frame feedback stator currents (Iα, Iβ) 128, 129 can be determined to be either adequate or inadequate and thus qualified or disqualified.

When the magnitude ($I_s$) of the stationary reference frame feedback stator currents greater than the high current threshold ($I_{sthhigh}$), the stationary reference frame feedback stator currents (Iα, Iβ) 128, 129 are adequate and qualified to be provided to and thus enable the controller 200, and the angle computation module 152 of the controller 200 receives the stationary reference frame feedback stator currents (Iα, Iβ) 128, 129. Based on these inputs the angle computation module 152 computes and outputs a computed phase current angle 153. In one embodiment, the angle computation module 152 of the controller 200 can use the stationary reference frame feedback stator currents (Iα, Iβ) 128, 129 to compute the phase current angle ($θ_{in}$) 153 based on equation (2) as follows:

$$θ_{in} = \arctan 2(i_β, i_α) \quad (2)$$

The computed phase current angle 153 is provided to the angular velocity observer module 154 which uses this input to generate an estimated angular position ($θ_{obs}$) 155 of the rotor and an estimated angular velocity ($ω_{obs}$) 156 of the rotor (e.g., estimated rotor angular velocity). The angular velocity observer module 154 can be implemented using any known angular velocity observer module such as a Luenberger angular velocity observer, Kalman filter, extended Kalman filter, or any variations thereof, etc. In one implementation, the angular velocity observer module 154 can be implemented as disclosed in U.S. Pat. No. 6,894,454 B2, entitled "Position Sensorless Control Algorithm For AC Machine" assigned to the assignee of the present invention, its contents being incorporated by reference in its entirety herein. These examples are non-limiting implementations, and it will be appreciated that other estimation techniques can be used to estimate the angular position ($θ_{obs}$) and angular velocity ($ω_{obs}$) of the rotor of the three-phase AC machine 120.

The angular difference confirmation module 158 is optional. When the angular difference confirmation module 158 is not implemented, the estimated angular velocity ($ω_{obs}$) 156 of the rotor passes directly from the angular velocity observer module 154 to the open/short controller module 164 without passing through optional angular difference confirmation module 158.

When the angular difference confirmation module 158 is implemented, the estimated angular position ($θ_{obs}$) 155 and the estimated angular velocity ($ω_{obs}$) 156 of the rotor are provided to the angular difference confirmation module 158 as illustrated in FIG. 1. The angular difference confirmation module 158 performs an additional check to determine whether the estimated angular position ($θ_{obs}$) 155 of the rotor is sufficiently accurate before allowing the estimated angular velocity ($ω_{obs}$) 156 of the rotor to pass to the open/short controller module 164. In other words, angular difference confirmation module 158 can be included in some embodiments to provide an additional check (based on the estimated angular position ($θ_{obs}$) 155 of the rotor) prior to providing the estimated angular velocity ($ω_{obs}$) 156 to the open/short controller module 164 to determine whether or not the estimated angular velocity ($ω_{obs}$) 156 of the rotor should be provided to the open/short controller module 164.

When the angular difference confirmation module 158 is implemented, the angular difference confirmation module 158 determines a magnitude of an angular difference ($|θ_{error}|$) between the computed phase current angle 153 and the estimated angular position ($θ_{obs}$) 155 of the rotor, and then compares the magnitude of the angular difference ($|θ_{error}|$) to an angular threshold ($θ_{thresh}$) to determine whether the magnitude of the angular difference ($|θ_{error}|$) is less than the angular threshold ($θ_{thresh}$).

When angular difference confirmation module 158 determines that the magnitude of the angular difference ($|θ_{error}|$) is less than the angular threshold ($θ_{thresh}$), the angular difference confirmation module 158 allows the estimated angular velocity ($ω_{obs}$) 156 of the rotor to pass to the open/short controller module 164.

By contrast, when angular difference confirmation module 158 determines that the magnitude of the angular difference ($|θ_{error}|$) is greater than or equal to the angular threshold ($θ_{thresh}$), the angular difference confirmation module 158 blocks the estimated angular velocity ($ω_{obs}$) 156 of the rotor from passing to the open/short controller module 164, and thus effectively disables the open/short controller module 164 since it will have no input signal to process and will therefore not generate any output signal 201.

When the open/short controller module 164 receives the estimated angular velocity ($ω_{obs}$) 156 of the rotor, the open/short controller module 164 determines, based on the estimated angular velocity ($ω_{obs}$) 156, whether an open-circuit fault response or a short-circuit fault response should be applied at the inverter module 110, and can then generate control signals 202-1 . . . 201-3 that are provided to the PWM module 108 to cause either the open-circuit fault response or the short-circuit fault response to be applied at the inverter module 110. The control signals 202-1 . . . 201-3 that are provided to the PWM module 108 can be referred to as either open-circuit fault response control signals 201, or short-circuit fault response control signals 201.

In one embodiment, the open/short controller module 164 compares the estimated angular velocity ($ω_{obs}$) 156 of the rotor to a transition angular velocity threshold ($ω_{Tth}$). In one implementation, the transition angular velocity threshold ($ω_{Tth}$) can be a fixed predetermined angular velocity and is defined based on parameters characteristic of the multi-phase electric machine. In another implementation, the transition angular velocity threshold ($ω_{Tth}$) can be an adjusted predetermined angular velocity and is defined based on parameters characteristic of the multi-phase electric machine adjusted according to at least one of a temperature of the multi-phase electric machine and a voltage of a voltage source.

In either implementation, when the open/short controller module 164 determines that the estimated angular velocity ($ω_{obs}$) 156 of the rotor is less than or equal to the transition angular velocity threshold ($ω_{Tth}$), the open/short controller module 164 generates open-circuit fault response control signals 201-1 . . . 201-3 that will cause an open-circuit fault response at the inverter module 110. When an open-circuit fault response is applied at the inverter module 110, the open-circuit fault response control signals 201 are designed to cause the output signals 109 from PWM module 108 to open all switches 182, 184, 186, 188, 190, 192 within the inverter module 110, and thus effectively place the switches 182, 184, 186, 188, 190, 192 in the inverter module 110 in an open state (also known as a three-phase open-circuit fault response).

When the open/short controller module 164 determines that the estimated angular velocity ($\omega_{obs}$) 156 of the rotor is greater than the transition angular velocity threshold ($\omega_{Tth}$), the open/short controller module 164 generates short-circuit fault response control signals 201-1 . . . 201-3 that will cause a short-circuit fault response at the inverter module 110. When the short-circuit fault response is applied at the inverter module 110, the close response control signals 201 are designed to cause the output signals 109 from PWM module 108 to close selected ones of the switches (e.g., 182, 186, 190, or 184, 188, 192) within the inverter module 110 to connect all phases of the inverter module 110 to a single bus (e.g., either the plus bus or the minus bus), and to cause all other non-selected switches (184, 188, 192, or 182, 186, 190) in the inverter module 110 to be open such that the non-selected switches are not connected to the single bus (e.g., either the plus bus or the minus bus). Collectively, this can be referred to as a short-circuit fault response, where half of the switches of the inverter module 110 are in a shorted state.

Figure 3:
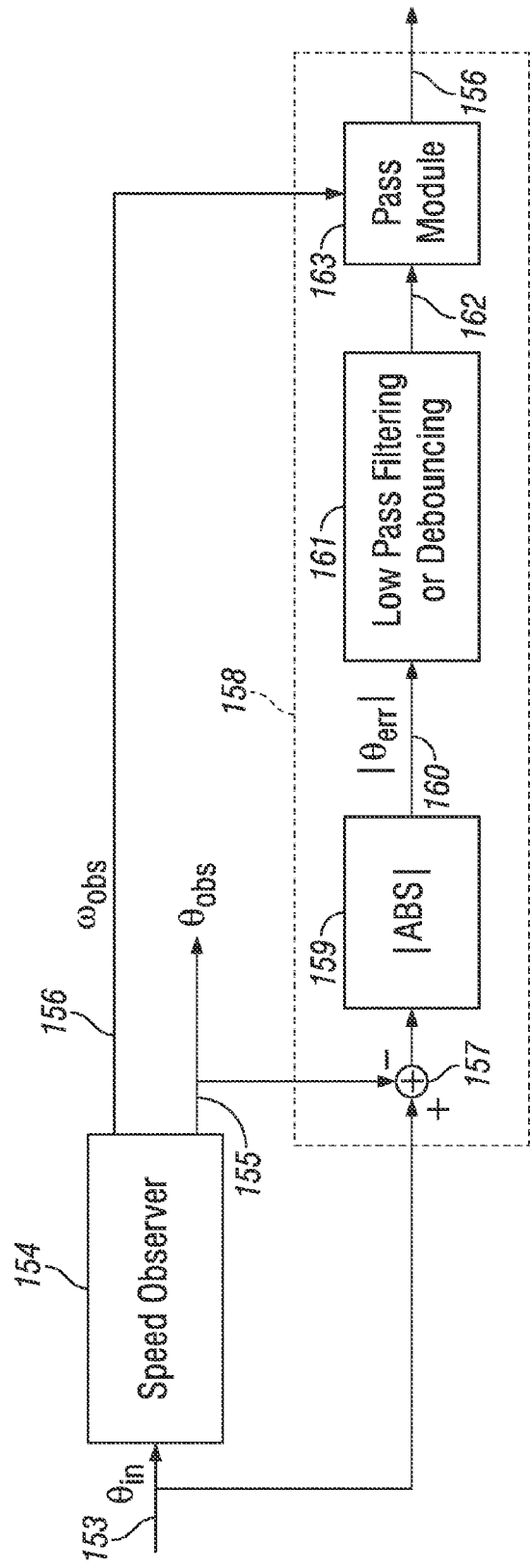
FIG. 3 is a block diagram of a portion of the controller of FIG. 1 in accordance with some of the disclosed embodiments.

FIG. 3 is a block diagram of a portion of the controller of FIG. 1 in accordance with some of the disclosed embodiments, specifically the speed observer module 154 and one particular implementation of the optional angular difference confirmation module 158 when the angular difference confirmation module 158 is implemented. As explained above, the angular difference confirmation module 158 performs an additional check to determine whether the estimated angular position ($\theta_{obs}$) 155 of the rotor is sufficiently accurate before allowing the estimated angular velocity ($\omega_{obs}$) 156 of the rotor to pass to the open/short controller module 164.

The operation of the speed observer module 154 is described above and will not be repeated for sake of brevity.

In this particular implementation, the angular difference confirmation module 158 comprises a summer module 157, a magnitude module 159, a low pass filter (LPF) 161 and a pass module 163.

The summer module 157 receives computed phase current angle ($\theta_{in}$) 153 and the estimated angular position ($\theta_{obs}$) 155 of the rotor, and subtracts the estimated angular position ($\theta_{obs}$) 155 of the rotor from the computed phase current angle ($\theta_n$) 153 to generate an angle error signal ($\theta_{error}$) that indicates the difference between the computed phase current angle ($\theta_{in}$) 153 and the estimated angular position ($\theta_{obs}$) 155 of the rotor.

This angle error ($\theta_{error}$) is provided to the magnitude module 159, which determines the magnitude of the angle error ($|\theta_{error}|$) 160. The magnitude of the angle error ($|\theta_{error}|$) 160 is a magnitude of an angular difference between the computed phase current angle 153 and the estimated angular position ($\theta_{obs}$) 155 of the rotor, and can be referred to as angle error magnitude ($|\theta_{error}|$) 160. The angle error magnitude ($|\theta_{error}|$) 160 is the absolute value of the angle error ($|\theta_{error}|$) 160.

The low pass filter (LPF) 161 low pass filters the angle error magnitude ($|\theta_{error}|$) 160 and generates a control signal 162 that is then compared to a threshold at pass module 163 to determine whether the estimated angular velocity ($\omega_{obs}$) 156 should be allowed to pass through to the open/short controller module 164 (of FIG. 1). The control signal 162 controls whether the pass module 163 allows the estimated angular velocity ($\omega_{obs}$) 156 to pass through to the open/short controller module 164 (of FIG. 1) or blocks the estimated angular velocity ($\omega_{obs}$) 156 from passing through to the open/short controller module 164 (of FIG. 1). When angular difference confirmation module 158 blocks the estimated angular velocity ($\omega_{obs}$) 156 of the rotor from passing to the open/short controller module 164, it effectively disables the open/short controller module 164 since it will have no input signal to process and will therefore not generate any output signals 201.

Figure 4:
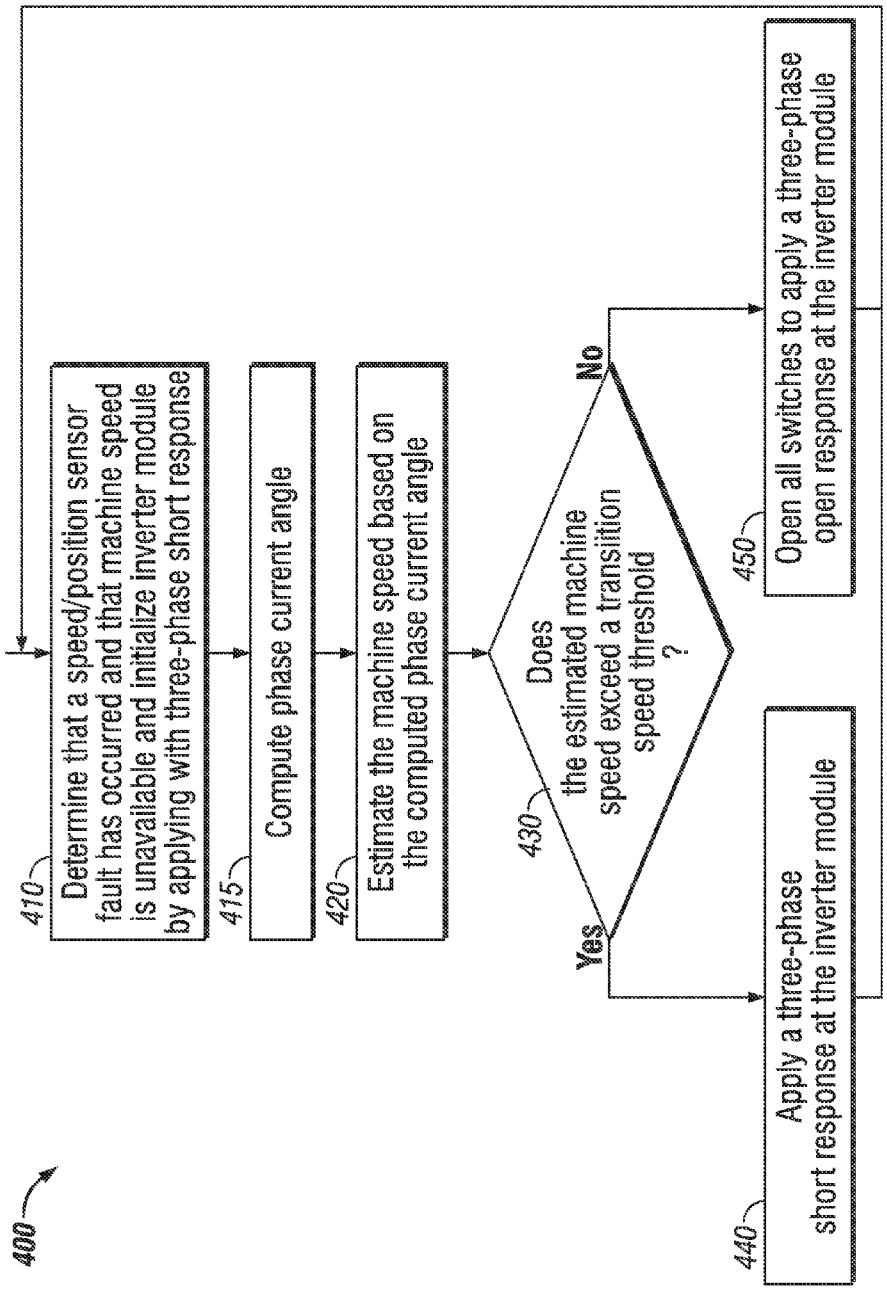
FIG. 4 is a flowchart that illustrates a method in accordance with some of the disclosed embodiments.

FIG. 4 is a flowchart that illustrates a method 400 in accordance with some of the disclosed embodiments. The method 400 of FIG. 4 can be applied, for example, to an electric motor drive system that includes a controller 200 that is coupled to a permanent magnet electric machine 120 and to an inverter module 110 that is also coupled to the permanent magnet electric machine 120.

At 410, the controller 200 determines that a speed/position sensor fault has occurred, and applies a three-phase short-circuit fault response at the inverter module 110. As such, the angular velocity ($\omega_r$) of the permanent magnet electric machine 120 is unavailable to make a decision regarding whether a three-phase open-circuit fault response or a three-phase short-circuit fault response should be applied at the inverter module 110 to minimize torque response of the machine 120.

At 415, the controller 200 monitors the stationary reference frame feedback stator currents (I$\alpha$, I$\beta$) 128, 129 (generated as a result of applying a three-phase short-circuit fault response at the inverter module 110), and uses the stationary reference frame feedback stator currents (I$\alpha$, I$\beta$) 128, 129 to compute and output a computed phase current angle 153.

At 420, the controller 200 uses the computed phase current angle 153 to generate an estimated angular position ($\theta_{obs}$) 155 of the rotor and an estimated angular velocity ($\omega_{obs}$) 156 of the rotor (e.g., estimated rotor angular velocity). The estimated angular velocity ($\omega_{obs}$) 156 of the rotor can then be used to determine whether or not to change to a three-phase open-circuit fault response at the inverter module 110.

At 430, the controller 200 determines whether the estimated angular velocity ($\omega_{obs}$) 156 of the rotor exceeds a transition angular velocity threshold ($\omega_{Tth}$).

When the estimated angular velocity ($\omega_{obs}$) 156 of the rotor is greater than the transition angular velocity threshold ($\omega_{Tth}$), at 440, the controller 200 generates short-circuit fault response control signals 201-1 . . . 201-3 that will cause a short-circuit fault response at the inverter module 110. In the short-circuit fault response, one-half of the switches of the inverter module 110 are in a shorted state. Specifically, with reference to FIGS. 1 and 2, when the short-circuit fault response is applied at the inverter module 110, the short-circuit fault response control signals 201 are designed to cause the output signals 109 from PWM module 108 to close selected ones of the switches (e.g., either switches 182, 186, 190, or switches 184, 188, 192) within the inverter module 110 to connect all phases of the inverter module 110 to a single bus (e.g., either the plus bus or the minus bus), and to cause all other non-selected switches (either switches 184, 188, 192, or switches 182, 186, 190) in the inverter module 110 to be open such that the non-selected switches are not connected to the single bus (e.g., either the plus bus or the minus bus).

When the estimated angular velocity ($\omega_{obs}$) 156 of the rotor is less than or equal to the transition angular velocity threshold ($\omega_{Tth}$), at 450, the controller 200 generates open-circuit fault response control signals 201-1 . . . 201-3 that will cause an open-circuit fault response to be applied at the inverter module 110. Specifically, with reference to FIGS. 1 and 2, when the open-circuit fault response is applied at the inverter module 110, the open-circuit fault response control signals 201 are designed to cause the output signals 109 from PWM module 108 to open all switches 182, 184, 186, 188, 190, 192 within the inverter module 110, and thus effectively place the switches 182, 184, 186, 188, 190, 192 in the inverter module 110 in an open state.

Following either 440 or 450, the method 400 then loops back to 410 where the method 400 repeats.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Embodiments described herein may be comprised of one or more conventional processors and unique stored program instructions that control the one or more processors to implement, in conjunction with certain non-processor circuits, some, most, or all of the functions for controlling operation of a multi-phase system, as described herein. As such, these functions may be interpreted as steps of a method for controlling operation of a multi-phase system.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Likewise, the control circuits described herein can be implemented using one or more application specific integrated circuits (ASICs), one or more microprocessors, and/or one or more digital signal processor (DSP) based circuits when implementing part or all of the control logic in such circuits.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the embodiments or claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

As used herein, the term "alternating current (AC) machine" generally refers to "a device or apparatus that converts electrical energy to mechanical energy or vice versa." An AC machine is an electric machine that is driven by an alternating current. AC machines can generally include synchronous AC machines that include permanent magnet machines. Permanent magnet machines include surface mount permanent magnet machines (SMPMMs) and interior permanent magnet machines (IPMMs).

Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator.

As used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a multi-phase inverter that drives a multi-phase electric machine, the method comprising:
  detecting a sensor fault of a sensor that is used for sensing at least one of a rotor position and a rotor angular velocity of the multi-phase electric machine;
  after detecting the sensor fault:
    estimating, based on feedback stator currents, angular velocity of a rotor of the multi-phase electric machine;
    determining whether the estimated angular velocity is greater than a transition angular velocity threshold;
    applying an open-circuit response at the multi-phase inverter when the estimated angular velocity of the multi-phase electric machine is less than the transition angular velocity threshold; and
    applying a short-circuit response at the multi-phase inverter when the estimated angular velocity is greater than the transition angular velocity threshold.

2. A method according to claim 1, wherein the applying the open-circuit response comprises:
  controlling all switches in the multi-phase inverter drive to be open.

3. A method according to claim 1, wherein the applying the short-circuit response comprises:
  controlling selected switches in the multi-phase inverter drive to connect all phases of the multi-phase inverter to a single bus; and
  controlling all other non-selected switches in the multi-phase inverter drive to be open such that the non-selected switches are not connected to the single bus.

4. A method according to claim 1, further comprising:
  after detecting the sensor fault and before estimating, applying the short-circuit response at the multi-phase inverter.

5. A method according to claim 1, further comprising:
  computing a phase current angle based on the feedback stator currents, and
  wherein estimating comprises:
    estimating, based on the phase current angle, the angular velocity of the rotor of the multi-phase electric machine and an angular position of the rotor of the multi-phase electric machine.

6. A method according to claim 5, further comprising:
  determining, prior to computing the phase current angle, whether the magnitude of the feedback stator currents are either qualified or disqualified for computing the phase current angle, wherein the phase current angle is computed when the magnitude of the feedback stator currents are determined to be qualified and is not computed when the magnitude of the feedback stator currents are determined to be disqualified.

7. A method according to claim 5, further comprising:
  determining, after estimating the angular velocity and the angular position of the rotor, whether the estimated angular position of the rotor is sufficiently accurate before determining whether the estimated angular velocity is greater than the transition angular velocity threshold.

8. A method according to claim 7, wherein determining, after estimating the angular velocity and the angular position of the rotor, whether the estimated angular position of the rotor is sufficiently accurate, comprises:
  after estimating the angular velocity and the angular position of the rotor and before determining whether the estimated angular velocity is greater than the transition angular velocity threshold, determining a magnitude of an angular difference between the computed phase current angle and the estimated angular position of the rotor; and
  determining whether the magnitude of the angular difference is less than an angular threshold ($\theta_{thresh}$); and
  wherein the step of determining whether the estimated angular velocity is greater than the transition angular velocity threshold is performed only when the magnitude of the angular difference is less than the angular threshold.

9. A method according to claim 1, wherein the feedback stator currents comprise:
  stationary reference frame feedback stator currents.

10. A method according to claim 1, wherein the transition angular velocity threshold is one of:
  a fixed predetermined angular velocity and is defined based on parameters characteristic of the multi-phase electric machine; and
  an adjusted predetermined angular velocity and is defined based on parameters characteristic of the multi-phase electric machine adjusted according to at least one of a temperature of the multi-phase electric machine and a voltage of a voltage source.

11. An apparatus, comprising:
  a multi-phase inverter to drive a multi-phase electric machine;
  a fault detector to indicate detection of a sensor fault of a sensor that is used for sensing at least one of a rotor position and a rotor angular velocity of the multi-phase electric machine, wherein the sensor is designed to provide at least one of an angular velocity signal indicative of the angular velocity of a rotor of a multi-phase electric machine, and an angular position signal indicative of the angular position of the rotor of the multi-phase electric machine; and
  a controller operable, in response to receiving an indication from the fault detector that the sensor fault has been detected, to estimate angular velocity of a rotor of the multi-phase electric machine based on feedback stator currents, to determine whether the estimated angular velocity is greater than a transition angular velocity threshold, and to apply either:
    an open-circuit response at the multi-phase inverter when the estimated angular velocity of the multi-phase electric machine is less than the transition angular velocity threshold; or
    a short-circuit response at the multi-phase inverter when the estimated angular velocity is greater than the transition angular velocity threshold.

12. An apparatus according to claim 11, wherein the open-circuit response is applied by controlling all switches in the multi-phase inverter drive to be open.

13. An apparatus according to claim 11, wherein the short-circuit response is applied by controlling selected switches in the multi-phase inverter drive to connect all phases of the multi-phase inverter to a single bus, and by controlling all other non-selected switches in the multi-phase inverter drive to be open such that the non-selected switches are not connected to the single bus.

14. An apparatus according to claim 11, wherein the controller is further operable to apply the short-circuit response at the multi-phase inverter after the sensor fault is defected and before the angular velocity of the rotor is estimated.

15. An apparatus according to claim 11, wherein the controller is further operable to compute a phase current angle based on the feedback stator currents, and
wherein the controller is further operable to estimate, based on the phase current angle, the angular velocity of the rotor of the multi-phase electric machine and an angular position of the rotor of the multi-phase electric machine.

16. An apparatus according to claim 15, wherein the controller is further operable, before the controller computes the phase current angle, to determine whether the magnitude of the feedback stator currents are either qualified or disqualified to compute the phase current angle,
wherein the phase current angle is computed when the magnitude of the feedback stator currents are determined to be qualified and is not computed when the magnitude of the feedback stator currents are determined to be disqualified.

17. An apparatus according to claim 15, wherein the controller is further operable, after the controller estimates the angular velocity and the angular position of the rotor and before the controller determines whether the estimated angular velocity is greater than the transition angular velocity threshold, to determine whether the estimated angular position of the rotor is sufficiently accurate.

18. An apparatus according to claim 17, wherein, after the controller estimates the angular velocity and the angular position of the rotor and before the controller determines whether the estimated angular velocity is greater than the transition angular velocity threshold, the controller is further operable to determine a magnitude of an angular difference between the computed phase current angle and the estimated angular position of the rotor, to determine whether the magnitude of the angular difference is less than an angular threshold ($\theta_{thresh}$), and to determine whether the estimated angular velocity is greater than the transition angular velocity threshold only when the magnitude of the angular difference is less than the angular threshold.

19. An apparatus according to claim 11, wherein the feedback stator currents comprise:
stationary reference frame feedback stator currents.

20. A non-transitory machine-readable medium comprising sets of instructions operable in a controller to cause the controller to perform operations in response to the controller receiving an indication that a sensor for sensing either a position or angular velocity of a rotor has faulted, the operations comprising:
estimating, based on feedback stator currents, angular velocity of a rotor of a multi-phase electric machine;
determining whether the estimated angular velocity is greater than a transition angular velocity threshold; and
generating control signals to cause either:
an open-circuit response to be applied at a multi-phase inverter when the estimated angular velocity of the multi-phase electric machine is less than the transition angular velocity threshold; or
a short-circuit response to be applied at the multi-phase inverter when the estimated angular velocity is greater than the transition angular velocity threshold.

* * * * *